United States Patent
Celone

(10) Patent No.: US 10,338,785 B2
(45) Date of Patent: Jul. 2, 2019

(54) PROCESSING SYSTEM FOR MULTIVARIATE SEGMENTATION OF ELECTRONIC MESSAGE CONTENT

(71) Applicant: Hartford Fire Insurance Company, Hartford, CT (US)

(72) Inventor: Nicholas George Celone, Cheshire, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 456 days.

(21) Appl. No.: 15/047,005

(22) Filed: Feb. 18, 2016

(65) Prior Publication Data
US 2017/0244658 A1    Aug. 24, 2017

(51) Int. Cl.
G06F 15/16 (2006.01)
G06F 3/0484 (2013.01)
H04L 12/58 (2006.01)

(52) U.S. Cl.
CPC ............ G06F 3/0484 (2013.01); H04L 51/02 (2013.01); H04L 51/063 (2013.01)

(58) Field of Classification Search
USPC .................... 709/206, 201, 202, 203, 223
See application file for complete search history.

(56) References Cited

U.S. PATENT DOCUMENTS

| | | | |
|---|---|---|---|
| 6,178,451 B1 * | 1/2001 | Huitema | H04L 41/147 702/128 |
| 7,386,485 B1 | 6/2008 | Mussman et al. | |
| 9,195,771 B2 * | 11/2015 | Strike | G06F 17/3089 |
| 2008/0097829 A1 | 4/2008 | Ritter | |
| 2008/0313571 A1 | 12/2008 | Bushey et al. | |
| 2009/0282205 A1 * | 11/2009 | Levy | G11B 20/00086 711/163 |
| 2010/0010865 A1 | 1/2010 | Dyer | |
| 2012/0022938 A1 | 1/2012 | McNea et al. | |
| 2014/0108572 A1 | 4/2014 | Borzilleri et al. | |
| 2014/0244345 A1 | 8/2014 | Sollis et al. | |
| 2014/0282049 A1 | 9/2014 | Lyon et al. | |
| 2015/0046250 A1 | 2/2015 | Williams et al. | |
| 2015/0066805 A1 * | 3/2015 | Candee | G06Q 30/0282 705/347 |
| 2015/0074650 A1 | 3/2015 | Bennett | |

* cited by examiner

Primary Examiner — Lan Dai T Truong
(74) Attorney, Agent, or Firm — Buckley, Maschoff & Talwalkar LLC

(57) ABSTRACT

Mediums, apparatus, computer program code, and means may be provided to launch electronic messages via a distributed communication network by an automated back-end application computer server. According to some embodiments, a database import table associated with a set of electronic destination communication addresses may be created. The set of electronic destination communication addresses may be automatically and dynamically split into multivariate segments, including at least: a current message content subset, a first modified message content subset, and a second modified message content subset. Current message content, first modified message content, and second modified message content may then be automatically launched to electronic destination communication addresses as appropriate in accordance with the multivariate segments. A results log may be created based on computer implemented responses to the messages, and indications associated with the results log may be transmitted to generate an interactive user interface display.

17 Claims, 12 Drawing Sheets

| NAME | SUBJECT | FORM NAME | DATE/TIME | DELIVERED | OPENED | CLICK-THROUGH |
|---|---|---|---|---|---|---|
| QUOTE3T3 | REGARDING... | HARTFORD... | 3/13/2018 6:15 AM | 331 | 85 | 21 |
| QUOTE3T2 | REGARDING... | HARTFORD... | 3/13/2018 6:16 AM | 349 | 89 | 20 |
| QUOTE3T4 | REGARDING... | HARTFORD... | 3/13/2018 6:16 AM | 350 | 87 | 19 |
| QUOTE3T1 | REGARDING... | HARTFORD... | 3/13/2018 6:17 AM | 329 | 83 | 23 |
| QUOTE2T3 | YOUR QUOTE... | HARTFORD... | 3/15/2018 8:23 AM | 344 | 88 | 24 |
| QUOTE2T4 | YOUR QUOTE... | HARTFORD... | 3/15/2018 8:24 AM | 348 | 91 | 20 |

PROCESSING SYSTEM FOR MULTIVARIATE SEGMENTATION OF ELECTRONIC MESSAGE CONTENT

BACKGROUND

Electronic files may be launched as messages to destination communication addresses via a distributed communication network. Moreover, in some cases the messages may be designed to elicit responses from remote communication devices. Note, however, that different types of electronic messages may generate different responses or response rates. For example, the layout, content, etc. of an electronic message may result in higher (or lower) response rates. In some cases, improving the response rate may result in substantial improvements to the operation of a network (e.g., by reducing an overall number of electronic messages that need to be created and transmitted via the network).

It would be desirable to provide systems and methods to automatically improve messages launched via a distributed communication network in a way that provides faster, more accurate results and that allows for flexibility and effectiveness when responding to those results.

SUMMARY OF THE INVENTION

According to some embodiments, systems, methods, apparatus, computer program code and means are provided to automatically improve messages launched via a distributed communication network. According to some embodiments, a database import table associated with a set of electronic destination communication addresses may be created. The set of electronic destination communication addresses may be automatically and dynamically split into multivariate segments, including at least: a current message content subset, a first modified message content subset, and a second modified message content subset. Current message content, first modified message content, and second modified message content may then be automatically launched to electronic destination communication addresses as appropriate in accordance with the multivariate segments. A results log may be created based on computer implemented responses to the messages, and indications associated with the results log may be transmitted to generate an interactive user interface display.

Some embodiments comprise: means for creating, by a back end application server based on information from a periodic data feed source input, a database import table associated with a set of electronic destination communication addresses; means for automatically and dynamically splitting the set of electronic destination communication addresses into multivariate segments, including at least: a current message content subset, a first modified message content subset, and a second modified message content subset; means for automatically launching current message content, first modified message content, and second modified message content to electronic destination communication addresses as appropriate in accordance with the multivariate segments; means for creating a results log based on computer implemented responses to the current message content, the first modified message content, and the second modified message content; and means for transmitting indications associated with the results log to generate an interactive user interface display.

In some embodiments, a communication device associated with a back-end application computer server exchanges information with remote devices. The information may be exchanged, for example, via public and/or proprietary communication networks.

A technical effect of some embodiments of the invention is an improved and computerized ways to automatically improve messages launched via a distributed communication network to provide faster, more accurate results and that allow for flexibility and effectiveness when responding to those results. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIGS. 10A and 10B illustrate exemplary results log displays that might be associated with various embodiments described herein.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of automatically improving messages launched via a distributed communication network by providing technical benefits in data accuracy, data availability and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks and subsystems. For example, in the present invention information may be transmitted to remote devices from a back-end application server and results may then be analyzed accurately to evaluate effectiveness of various electronic messages, thus improving the overall performance of the system associated with message storage requirements and/or bandwidth considerations (e.g., by reducing the number of messages that need to be transmitted via a network). Moreover, embodiments associated with automatic multivariate message launch throttling might further improve communication network performance, call center response times, real time chat availability, etc.

Electronic files may be launched as messages to destination communication addresses via a distributed communication network. Moreover, in some cases the messages may be designed to elicit responses from remote communication devices. Note, however, that different types of electronic messages may generate different responses or response rates. For example, the layout, content, etc. of an electronic message may result in higher (or lower) response rates. In some cases, improving the response rate may result in substantial improvements to the operation of a network (e.g., by reducing an overall number of electronic messages that need to be created and transmitted via the network).

Figure 1:
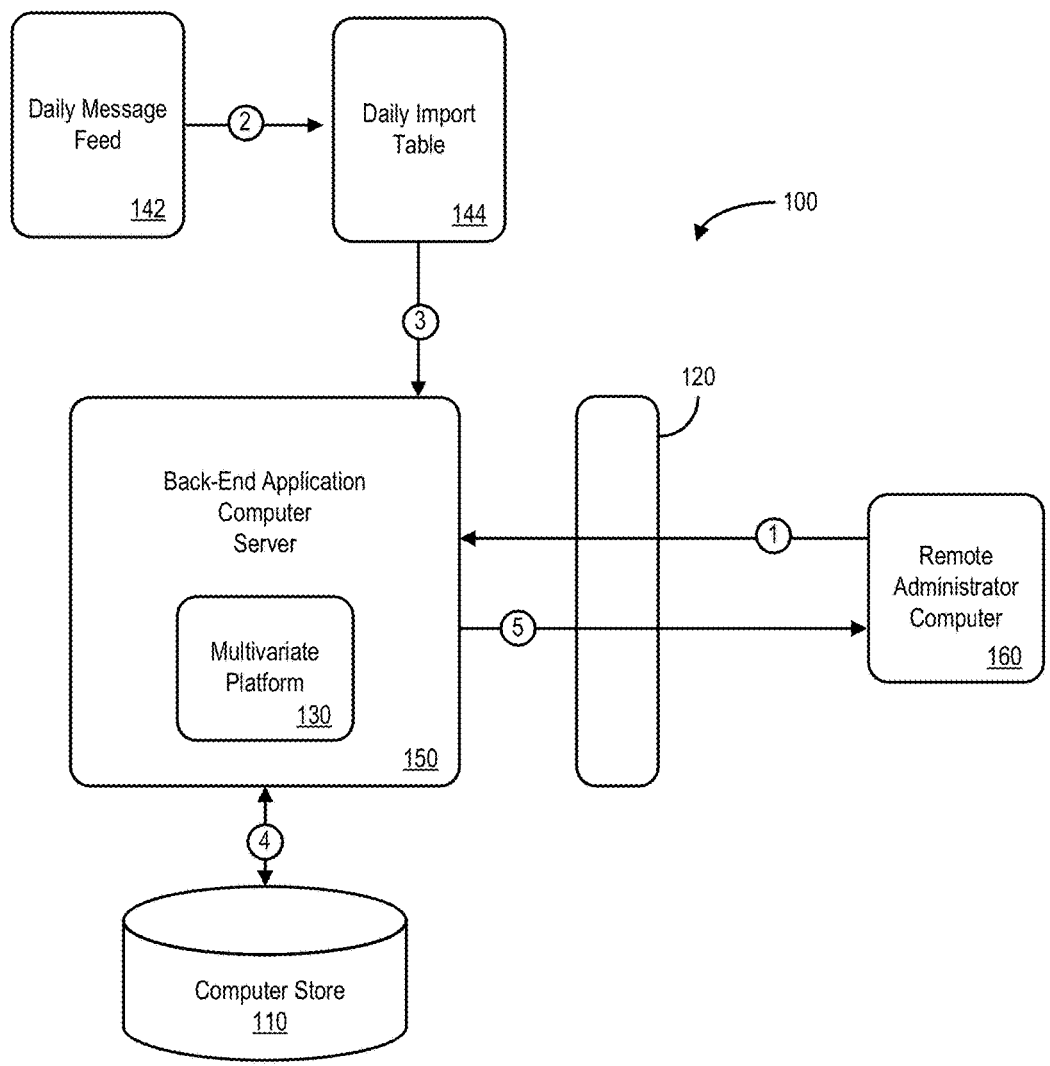
FIG. 1 is a high-level block diagram of a system according to some embodiments of the present invention.

It would be desirable to provide systems and methods to automatically improve messages launched via a distributed communication network in a way that provides faster, more accurate results and that allows for flexibility and effectiveness when responding to those results. FIG. 1 is a high-level block diagram of a system 100 according to some embodiments of the present invention. In particular, the system 100 includes a back-end application computer server 150 that may access information in a computer store 110 (e.g., storing a set of electronic destination communication addresses, message content, etc.). The back-end application computer server 150 may also exchange information with a remote administrator computer 160 (e.g., via a firewall 120). According to some embodiments, a multivariate platform 130 of the back-end application computer server 150 may facilitate a launch of electronic messages via a distributed communication network and/or the display of results via one or more remote administrator computers 160. The back-end application computer server 150 may further receive information associated with a daily message feed 142 (e.g., via a daily import table 144). Although "daily" is used as an example in FIG. 1, note that embodiments may be associated with other periodic (or asynchronous) types of scheduling. Note that the back-end application computer server 150 might be associated with a third party, such as a vendor that performs a service for an enterprise.

The back-end application computer server 150 might be, for example, associated with a Personal Computer ("PC"), laptop computer, smartphone, an enterprise server, a server farm, and/or a database or similar storage devices. According to some embodiments, an "automated" back-end application computer server 150 may facilitate the launch of electronic messages and/or an evaluation of results associated with entities in the computer store 110. As used herein, the term "automated" may refer to, for example, actions that can be performed with little (or no) intervention by a human.

As used herein, devices, including those associated with the back-end application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the computer store 110. The computer store 110 might, for example, store data associated with a set of entities, each entity being associated with a different communication address. The computer store 110 may also contain past and current interactions with remote communication devices. The computer store 110 may be locally stored or reside remote from the back-end application computer server 150. As will be described further below, the computer store 110 may be used by the back-end application computer server 150 to generate and/or evaluate electronic messages. Although a single back-end application computer server 150 is shown in FIG. 1, any number of such devices may be included. Moreover, various devices described herein might be combined according to embodiments of the present invention. For example, in some embodiments, the back-end application computer server 150 and computer store 110 might be co-located and/or may comprise a single apparatus.

According to some embodiments, the system 100 may automatically launch electronic messages over a distributed communication network via the automated back-end application computer server 150. For example, at (1) the remote administrator computer 160 may request establish and/or customize communication addresses and/or message content. Information may be transmitted from the daily message feed 142 to the daily import table at (2) and then forwarded to the back-end application computer server 150 at (3). The multivariate platform 130 may then access information in the computer store at (4), launch messages as appropriate and/or evaluate responses to those messages, and transmit a results log to the administrator at (5).

Figure 2:
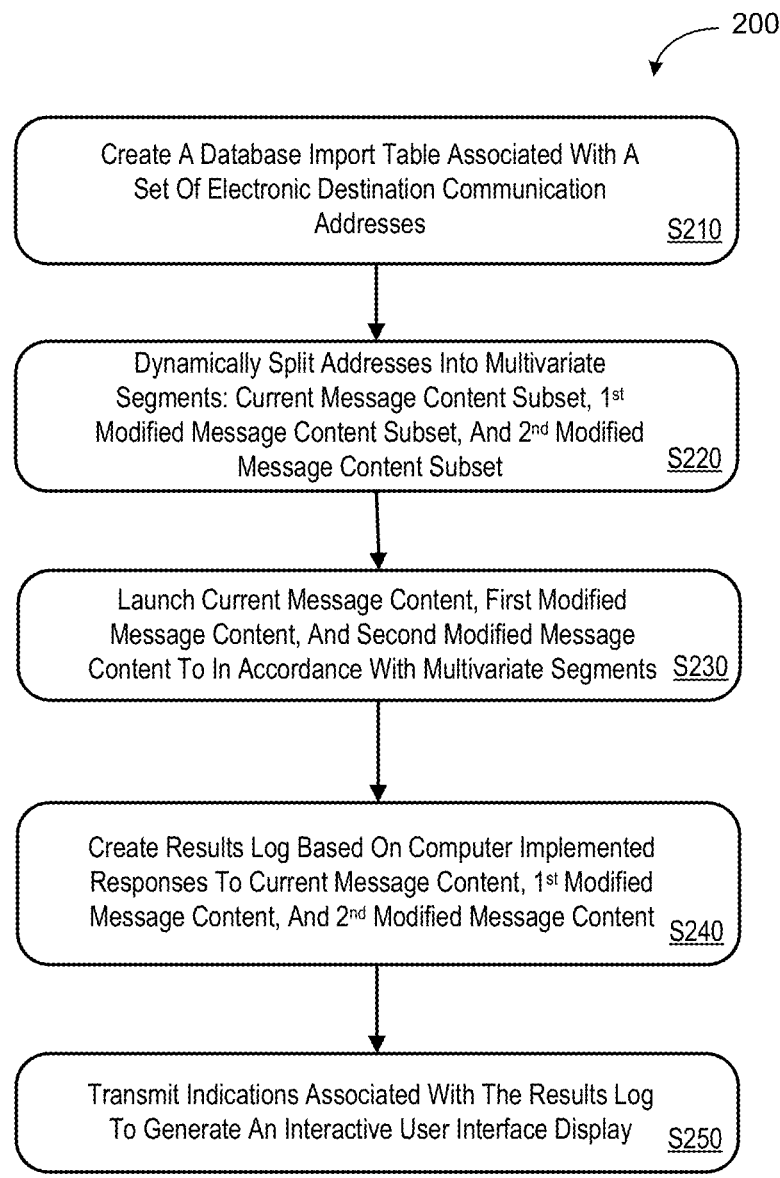
FIG. 2 illustrates a method according to some embodiments of the present invention.

Note that the system 100 of FIG. 1 is provided only as an example, and embodiments may be associated with additional elements or components. According to some embodiments, the elements of the system 100 automatically generates and launches messages (and evaluates responses to those messages) over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a back end application server may create, based on information from a periodic data feed source input, a database import table associated with a set of electronic destination communication addresses. Note that at least some database interactions described herein may comprise an import suppression, an import definition, an audience filter, a filter activity definition, a query definition, and/or content launching.

At S220, the system may automatically and dynamically split the set of electronic destination communication addresses into multivariate segments, including at least: a current message content subset, a first modified message content subset, and a second modified message content subset. According to some embodiments, the multivariate segments are automatically and randomly generated via database query activity.

At S230, the system may automatically launch current message content, first modified message content, and second modified message content to electronic destination communication addresses as appropriate in accordance with the multivariate segments. According to some embodiments, the electronic messages comprise emails. In this case, the current message content, the first modified message content, and/or the second modified message content might differ with respect to at least one of: a message subject, a message body, a message layout, message text, and/or a message image.

At S240, the system may create a results log based on computer implemented responses to the current message content, the first modified message content, and the second modified message content. As used herein, the phrase "computer implemented response" may refer to, for example, any activity performed via a remote device that received a message. For example, a user opening an email, clicking on a link, logging onto a web site, etc., are all examples of computer implemented responses to a message.

At S250, the system may transmit indications associated with the results log to generate an interactive user interface display. According to some embodiments, the interactive user interface display is associated with an aggregate custom report comparing content metrics across the multivariate segments. The content metrics might be associated with, for example, message unique open indications, message unique click-through indications, and/or a response rate.

Figure 3:
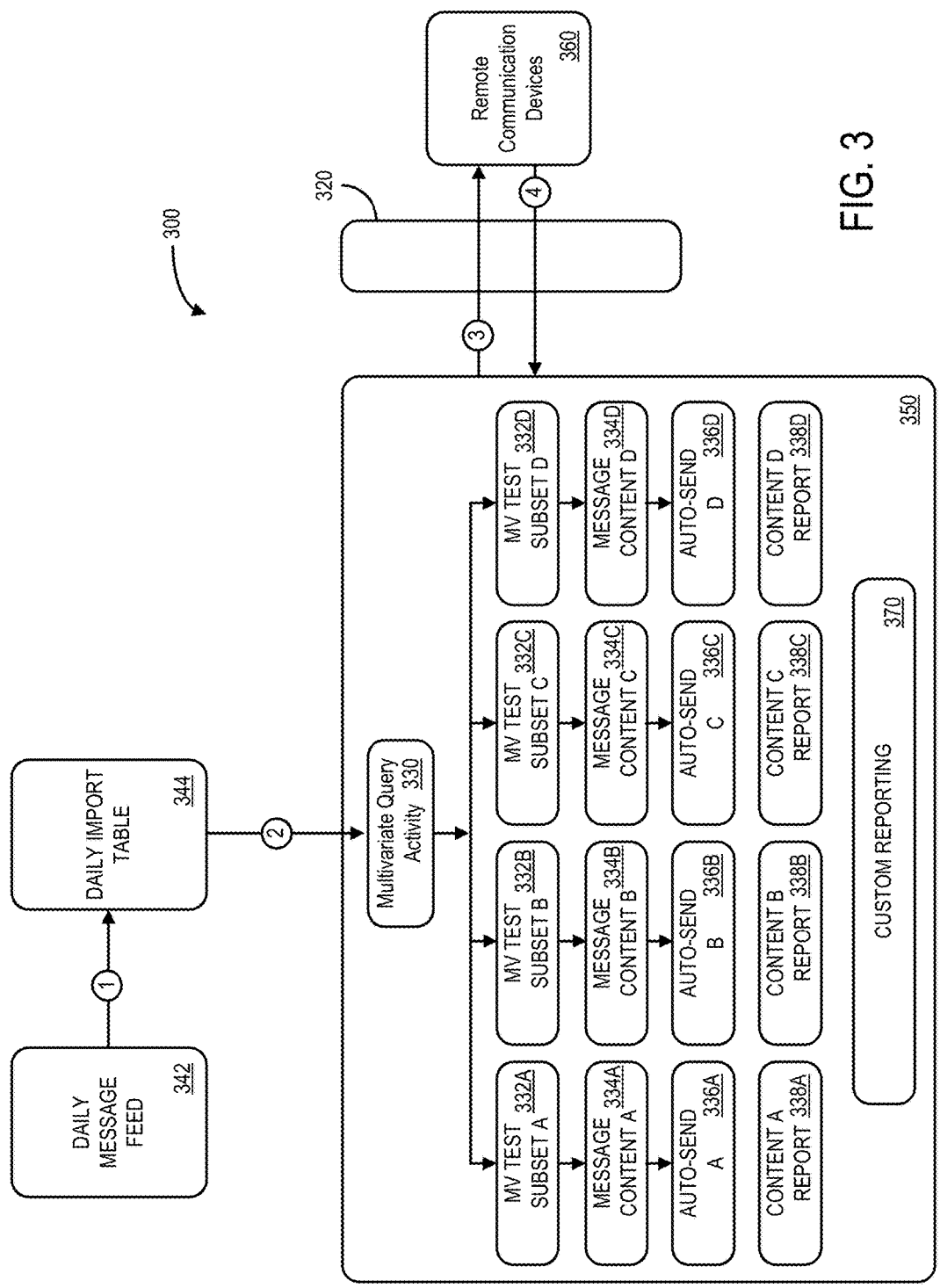
FIG. 3 is block diagram of a system in accordance with some embodiments of the present invention.

Some of the embodiments described herein may be implemented via an enterprise system. For example, FIG. 3 is block diagram of a system 300 according to some embodiments of the present invention. As in FIG. 1, the system 300 includes a back-end application computer server 350. A daily message feed 342 supplies information to a daily import table 244 at (1). The information in the daily import table 344 may then be accessed by a multivariate query activity 330 of the back-end application computer server 350 at (2). The multivariate query activity 330 may then split a set of electronic destination communication addresses (e.g., email addresses) into a test subset A 332A, a test subset B 332B, a test subset C 332C, and a test subset D 332D. According to some embodiments, test subset A 332A is associated with an original message content while test subset B 332B, test subset C 332C, and a test subset D 332D are associated with variations to that original message content. The system 300 may then create message content A 334A, message content B 334B, message content C 334C, and message content D 334D (e.g., by selecting message subjects, headers, layouts, images, etc. for each message).

The system 300 may then automatically launch or send message content A 336A, message content B 336B, message content C 336C, and message content D 336D at (3) (e.g., by transmitting email messages to remote communication devices 360 via the Internet 320). The system 300 may evaluate responses to those messages at (4) and automatically create a results log report for message content A 338A, message content B 338B, message content C 338C, and message content D 338D (e.g., by indicating click-through rates for each type of content). According to some embodiments, custom reporting 370 may aggregate a custom report that compares content performance across all send activity.

Thus, the system 300 may provide a process that facilitates an automated testing of email content (e.g., associated with a series of follow-up mails for a personal line of insurance quote). Moreover, embodiments may encompass multivariate testing for dynamic email content and subject lines, and an automated query step may randomly split daily data feed into A/B/C/D audiences for content testing. Still further, custom reports may be developed to provide direct comparisons between A/B/C/D content performances.

Figure 4:
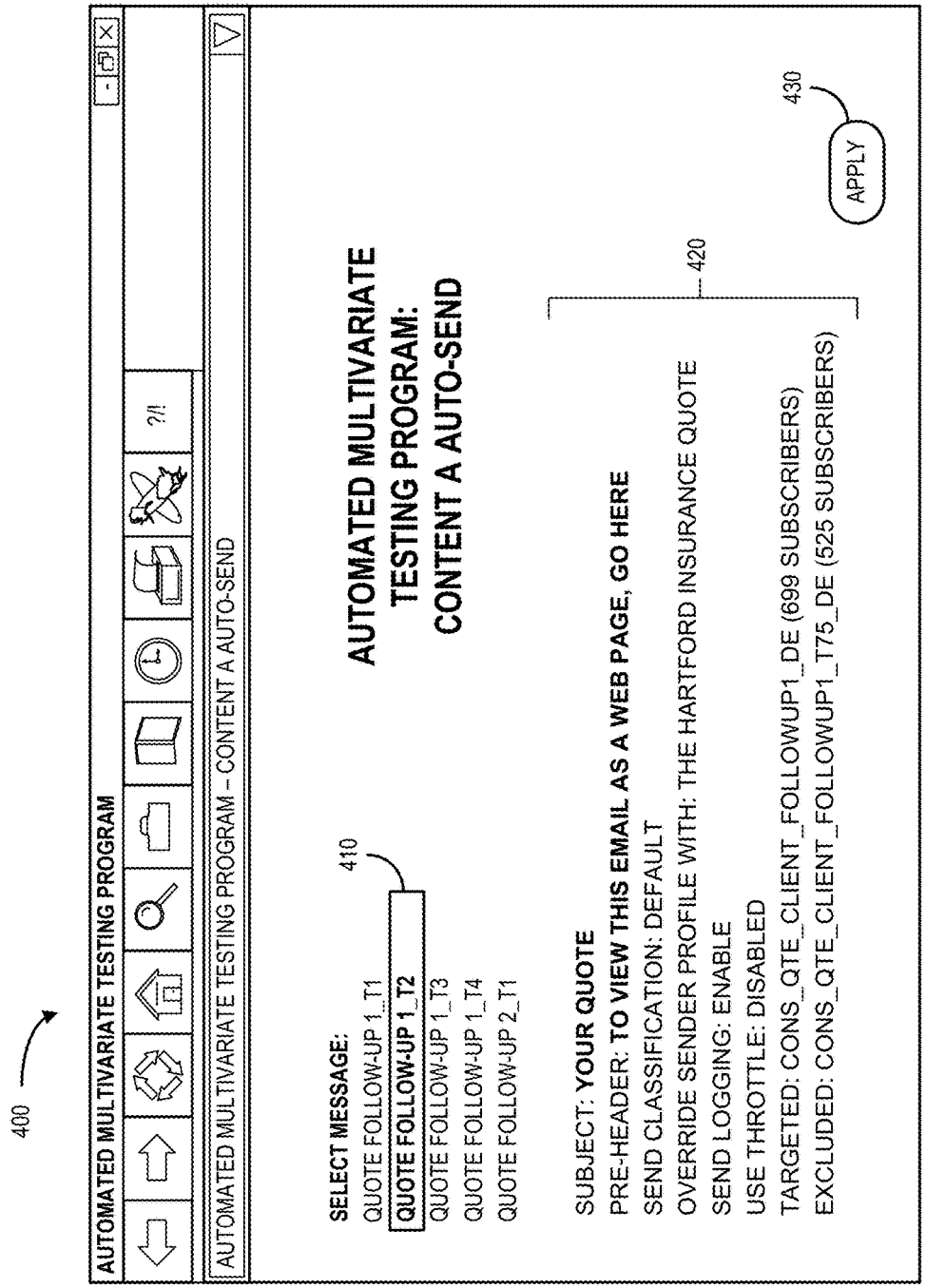
FIG. 4 illustrates an exemplary display that might be associated with various embodiments described herein.

FIG. 4 illustrates an exemplary display 400 that might be associated with various embodiments described herein. The display 400 might be used, for example, by an administrator or operator to create and/or customize multivariate content. In particular, a particular electronic message 410 may be selected and further aspects of the message may be defined via area 420 (e.g., the subject of the message, addresses to be excluded from a launch of the messages, etc.) and then applied via icon 430. Note that some or all of the selections performed via the display 400 might instead be automated and/or rely on a predictive model (as described with respect to FIG. 9). According to some embodiments, the area 420 lets an administrator or operator define a "throttling" parameter for outgoing multivariate outgoing messages. The throttling parameter might, for example, specify a rate at which outgoing messages should be transmitted (e.g., 100 per hour). This automatic slowing down of message transmission might, for example, help avoid a call center, help desk facility, etc. from becoming overwhelmed with audience responses. The area 420 may also let an administrator or operator define a time window during which messages should be transmitted (e.g., from 9:00 AM to 3:00 PM). This may help avoid disturbing audience members (e.g., with messages that arrive during the middle of the night), be synchronized with hours of call center operation, take into account different time zones (e.g., by rolling out launches of the multivariate content from the Eastern Standard Time zone to the Pacific Standard Time zone), be coordinated with other messages being transmitted, etc. According to some embodiments, some or all of the throttling characteristics may be automatically determined by the system based on business logic, one or more predictive models, real-time and/or historic call center data, etc. An administrator or operator might then be allowed to make adjustments to the automatically determined parameters.

Figure 5:
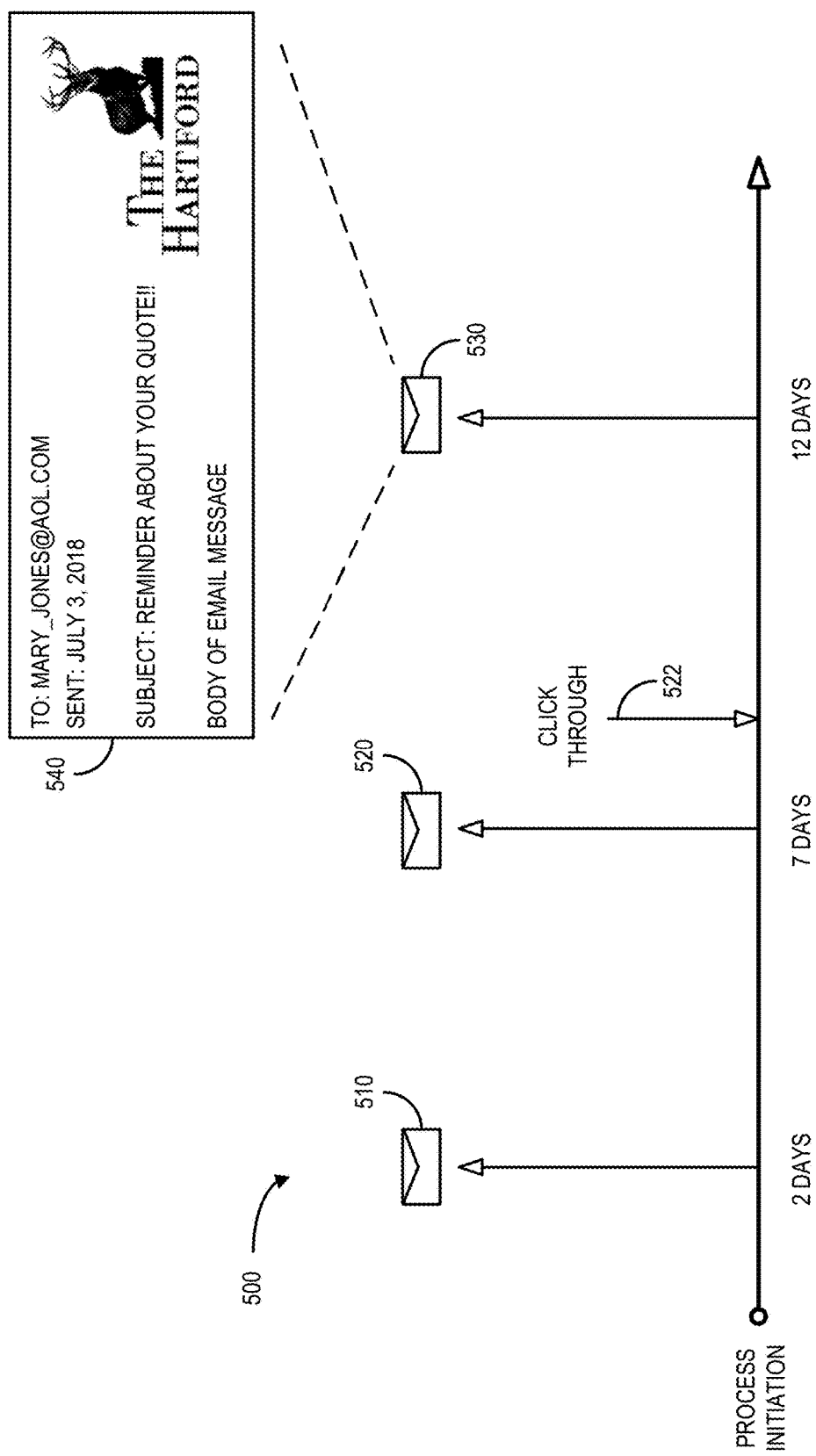
FIG. 5 is a messaging timeline in accordance with some embodiments.

In some cases, multivariate testing may be associated with a series of related electronic messages (e.g., to the same destination communication address). For example, FIG. 5 is a messaging timeline 500 in accordance with some embodiments. In this example, a related series of electronic messages 510, 520, 530 are to be distributed over a period of time (in particular, at 2 days, 7 days, and 12 days after a process is initiated), and a multivariate segment creation and content launching are automatically performed for each electronic message in the series. Moreover, as illustrated by the sample 540 of the third message 530, each message has content (e.g., a subject line, an email body, images, etc.) that may be customized. The timeline 500 further illustrates that a response 522 may be received in connection with one or more of the email messages 510, 520, 530.

Thus, some embodiments may provide a process for testing email content and subject lines for an automated email series (e.g., sent from Customer Relationship Management ("CRM") cloud application). For example, an enterprise may be interested in optimizing an email template for a long-running follow-up automated email series by testing 3 new email template versions against a current template (control content A). An automated multivariate testing program may accomplish this following three steps to: (I) randomly split a daily audience into four test segments via query programs, (II) align those segments with four email templates chosen to test to assess the best performing (most opens and clicks) and transmitted daily for a desired test period, and (III) generate reports (reflecting open and click-through responses to the emails) per test version to inform the enterprise about the best performing template.

Figure 6:
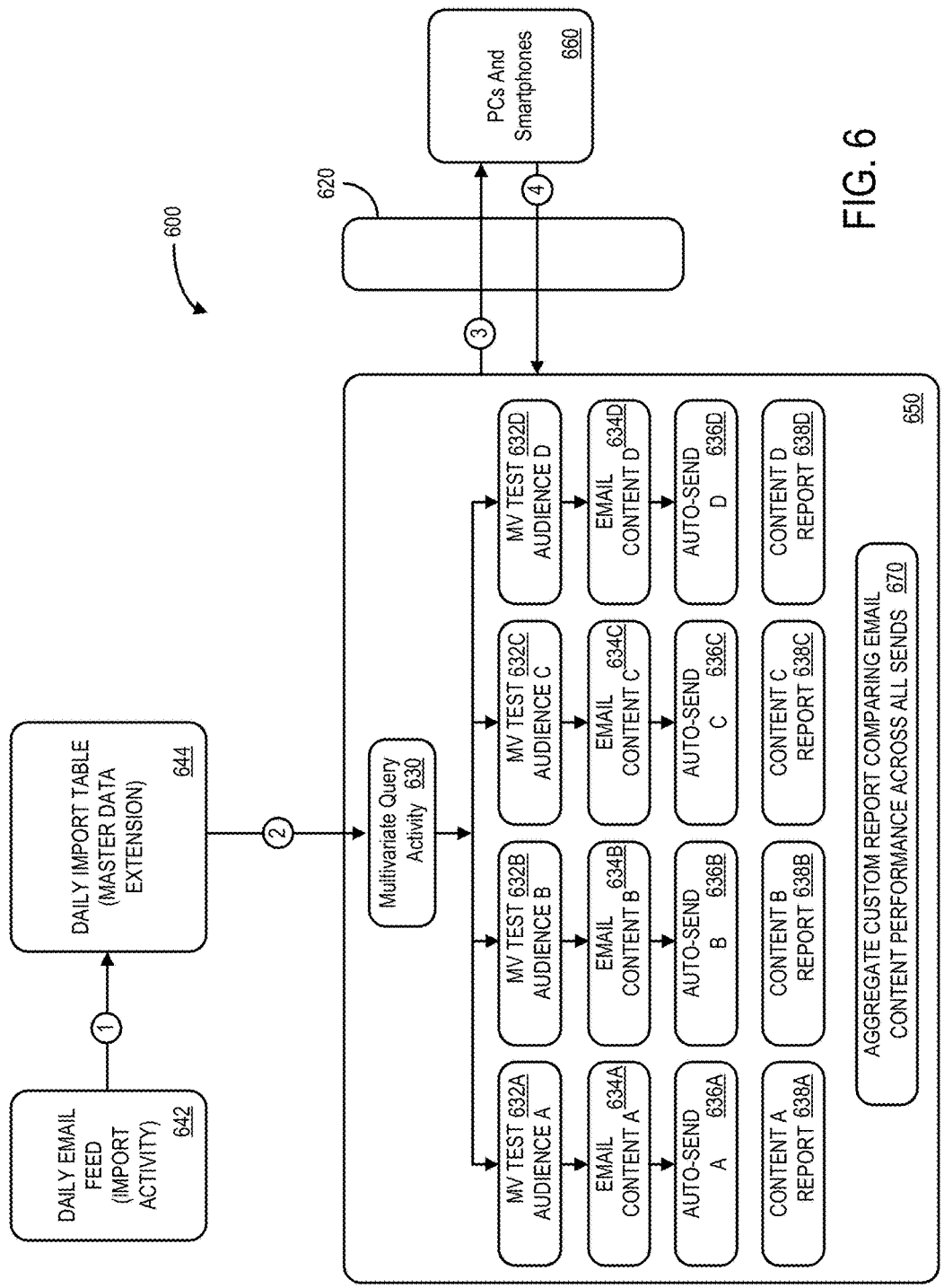
FIG. 6 is block diagram of an email system in accordance with some embodiments of the present invention.

FIG. 6 is block diagram of an email system in accordance with some embodiments of the present invention. As in FIG. 3, the system 600 includes a back-end application computer server 650. A daily email feed 642 (import activity) supplies information to a daily import table 644 (master data extension) at (1). The information in the daily import table 644 may then be accessed by a multivariate query activity 630 of the back-end application computer server 650 at (2). The multivariate query activity 630 may then split a set of electronic destination communication addresses (e.g., email addresses) into a test audience A 632A, a test audience B 632B, a test audience C 632C, and a test audience D 632D. According to some embodiments, test audience A 632A is associated with an original email content while test audience B 632B, test audience C 632C, and a test audience D 632D are associated with variations to that original email content. The system 600 may then create email content A 634A, email content B 634B, email content C 634C, and email content D 634D (e.g., by selecting email subjects, headers, layouts, images, etc. for each email).

The system 600 may then automatically launch or send email content A 636A, email content B 636B, email content C 636C, and email content D 636D at (3) (e.g., by transmitting email emails to remote PCs and smartphones 660 via the Internet 620). The system 600 may evaluate responses to those emails at (4) and automatically create a results log report for email content A 638A, email content B 638B, email content C 638C, and email content D 638D (e.g., by indicating click-through rates for each type of content). According to some embodiments, custom reporting 670 may aggregate a custom report that compares content performance across all send activity.

Note that the full email audience for a specific series stage (emails 1, 2 or 3 in a 3-stage email series) may be randomly split into four multivariate test audiences (MV TEST AUDIENCE A, B, C, D) via the following query activities types and user initiated send configurations in a CRM cloud application:

CONS_QTE_CLIENT_FOLLOW-UP1_T25_QA
    (select top 25 percent * from [CONS_QTE_CLIENT_FOLLOW-UP1_DE])
    CONS_QTE_CLIENT_FOLLOW-UP1_T50_QA
    (to select top 50 percent * from [CONS_QTE_CLIENT_FOLLOW-UP1_DE])
    CONS_QTE_CLIENT_FOLLOW-UP1_T75_QA
    (to select top 75 percent * from [CONS_QTE_CLIENT_FOLLOW-UP1_DE]_
    CONS_QTE_CLIENT_FOLLOW-UP2_T25_QA
    (to select top 25 percent * from [CONS_QTE_CLIENT_FOLLOW-UP2_DE])
    CONS_QTE_CLIENT_FOLLOW-UP2_T50_QA
    (to select top 50 percent * from [CONS_QTE_CLIENT_FOLLOW-UP2_DE])
    CONS_QTE_CLIENT_FOLLOW-UP2_T75_QA
    (to select top 75 percent * from [CONS_QTE_CLIENT_FOLLOW-UP2_DE])

A similar approach may be performed to select the top 25, 50, and 75 percent for the third email content.

An email launch program may initially implement import suppression so that particular domains will not be transmitted. Appropriate content may be imported and audience filters may be applied as follows:

FilterActivity Definition: CONS_QTE_CLIENT_FOLLOW-UP1_FA
    FilterActivity Definition: CONS_QTE_CLIENT_FOLLOW-UP2_FA
    FilterActivity Definition: CONS_QTE_CLIENT_FOLLOW-UP3_FA
    FilterActivity Definition: CONS_QTE_MALLS_FOLLOW-UP1_FA
    FilterActivity Definition: CONS_QTE_MALLS_FOLLOW-UP2_FA
    FilterActivity Definition: CONS_QTE_MALLS_FOLLOW-UP3_FA According to some embodiments, queries may then be implemented via query definitions as follows:

Query Definition: CONS_QTE_CLIENT_FOLLOW-UP1_T25_QA
    Query Definition: CONS_QTE_CLIENT_FOLLOW-UP1_T50_QA
    Query Definition: CONS_QTE_CLIENT_FOLLOW-UP1_T75_QA
    Query Definition: CONS_QTE_CLIENT_FOLLOW-UP2_T25_QA
    Query Definition: CONS_QTE_CLIENT_FOLLOW-UP2_T50_QA
    Query Definition: CONS_QTE_CLIENT_FOLLOW-UP2_T75_QA
    Query Definition: CONS_QTE_CLIENT_FOLLOW-UP3_T25_QA
    Query Definition: CONS_QTE_CLIENT_FOLLOW-UP3_T75_QA
    . . .

A multivariate client launch may then be implemented via user initiated emails as follows:

User Initiated Email: CONS_QTE_CLIENT_FOLLOW-UP1_T1_MI
    User Initiated Email: CONS_QTE_CLIENT_FOLLOW-UP1_T2_MI
    User Initiated Email: CONS_QTE_CLIENT_FOLLOW-UP1_T3_MI
    User Initiated Email: CONS_QTE_CLIENT_FOLLOW-UP1_T4_MI
    User Initiated Email: CONS_QTE_CLIENT_FOLLOW-UP2_T1_MI
    User Initiated Email: CONS_QTE_CLIENT_FOLLOW-UP2_T2_MI
    . . .
    User Initiated Email: CONS_QTE_CLIENT_FOLLOW-UP3_T4_MI According to some embodiments, email reports may be automatically generated per-multivariate email test version for easy performance analysis by a digital marketing team.

Figure 7:
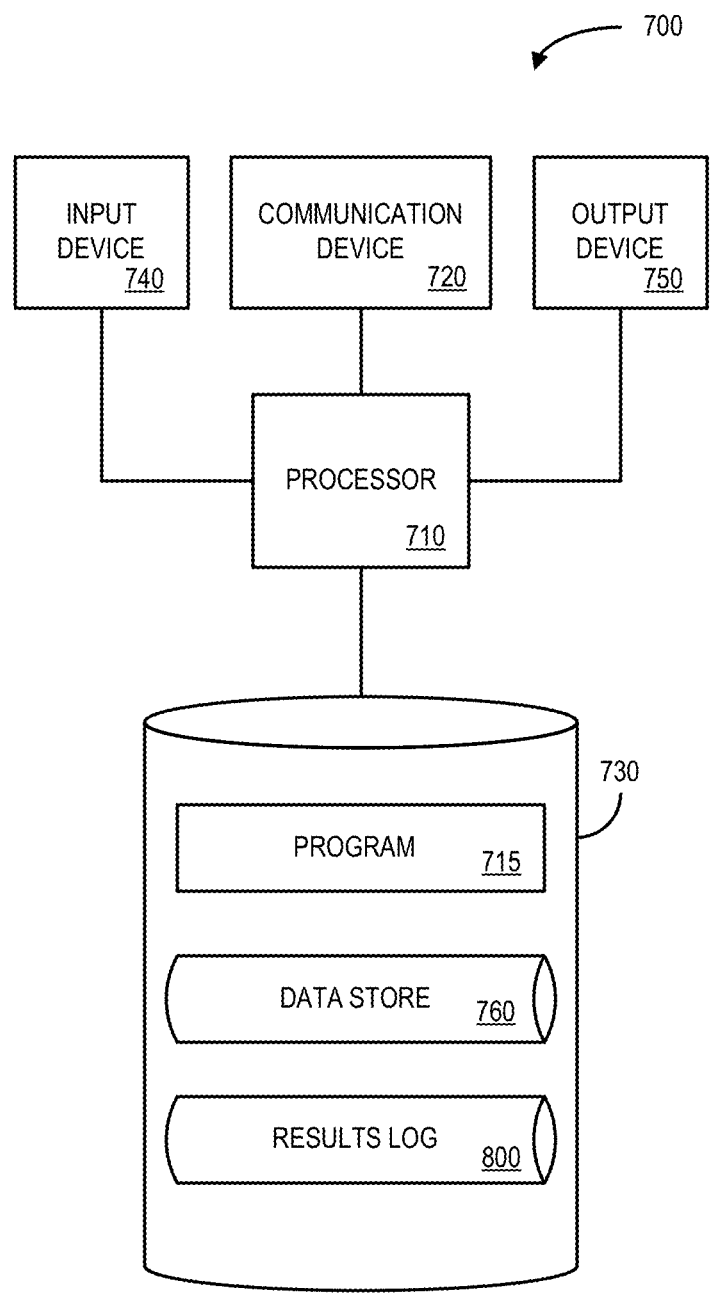
FIG. 7 is a block diagram of an apparatus in accordance with some embodiments of the present invention.

The embodiments described herein may be implemented using any number of different hardware configurations. For example, FIG. 7 illustrates a back-end application computer server 700 that may be, for example, associated with the systems 100, 300 of FIGS. 1 and 3, respectively. The back-end application computer server 700 comprises a processor 710, such as one or more commercially available Central Processing Units ("CPUs") in the form of one-chip microprocessors, coupled to a communication device 720 configured to communicate via a communication network (not shown in FIG. 7). The communication device 720 may be used to communicate, for example, with one or more remote administrator computers and or communication devices (e.g., PCs and smartphones). Note that communications exchanged via the communication device 720 may utilize security features, such as those between a public internet user and an internal network of the insurance enterprise. The security features might be associated with, for example, web servers, firewalls, and/or PCI infrastructure. The back-end application computer server 700 further includes an input device 740 (e.g., a mouse and/or keyboard to enter information about message content, destination email addresses, historic information, predictive models, etc.) and an output device 750 (e.g., to output reports regarding system administration and/or message content performance).

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 715 and/or a risk evaluation tool or application for controlling the processor 710. The processor 710 performs instructions of the program 715, and thereby operates in accordance with any of the embodiments described herein. For example, the processor 710 may create a database import table associated with a set of electronic destination communication addresses. The set of electronic destination communication addresses may be automatically and dynamically split into multivariate segments by the processor 710, including at least: a current message content subset, a first modified message content subset, and a second modified message content subset. Current message content, first modified message content, and second modified message content may then be automatically launched by the processor 710 to electronic destination communication addresses as appropriate in accordance with the multivariate segments. A results log may be created by the processor 710 based on computer implemented responses to the messages, and indications associated with the results log may be transmitted to generate an interactive user interface display.

The program 715 may be stored in a compressed, uncompiled and/or encrypted format. The program 715 may furthermore include other program elements, such as an operating system, a database management system, and/or device drivers used by the processor 710 to interface with peripheral devices.

As used herein, information may be "received" by or "transmitted" to, for example: (i) the back-end application computer server 700 from another device; or (ii) a software application or module within the back-end application computer server 700 from another software application, module, or any other source.

In some embodiments (such as shown in FIG. 7), the storage device 730 further stores a computer store 760 (e.g., associated with a set of destination communication addresses, message content, etc.) and a results log database 800. An example of a database that might be used in connection with the back-end application computer server 700 will now be described in detail with respect to FIG. 8. Note that the database described herein is only an example, and additional and/or different information may be stored therein. Moreover, various databases might be split or combined in accordance with any of the embodiments described herein. For example, the computer store 760 and/or results log database 800 might be combined and/or linked to each other within the program 715.

Figure 8:
FIG. 8 is a portion of a tabular database storing results in accordance with some embodiments.

Referring to FIG. 8, a table is shown that represents the results log database 800 that may be stored at the back-end application computer server 700 according to some embodiments. The table may include, for example, entries identifying electronic messages that were transmitted. The table may also define fields 802, 804, 806, 808, 810, 812 for each of the entries. The fields 802, 804, 806, 808, 810, 812 may, according to some embodiments, specify: a message identifier 802, a communication address 804, a subject 806, content 808, a status 810, and a result 812. The results log database 800 may be created and updated, for example, based on information electrically received from remote communication devices (e.g., PCs and smartphones).

The message identifier 802 may be, for example, a unique alphanumeric code identifying an electronic message (e.g., email message) that was launched to a particular destination communication address 804 (e.g., email address). The subject 806 and content 808 of the message might represent, for example, an automatically selected email subject line, text in the body of an email message, an image attached to an email message, etc. The status 810 might indicate if the message has been "sent" or is currently "pending" to be sent in the future. The result 812 might indicate, for example, if the message resulted in a click-through or other response from the communication device that received the email message (e.g., so the effectiveness of the subject 806 and content 808 may be evaluated).

Figure 9:
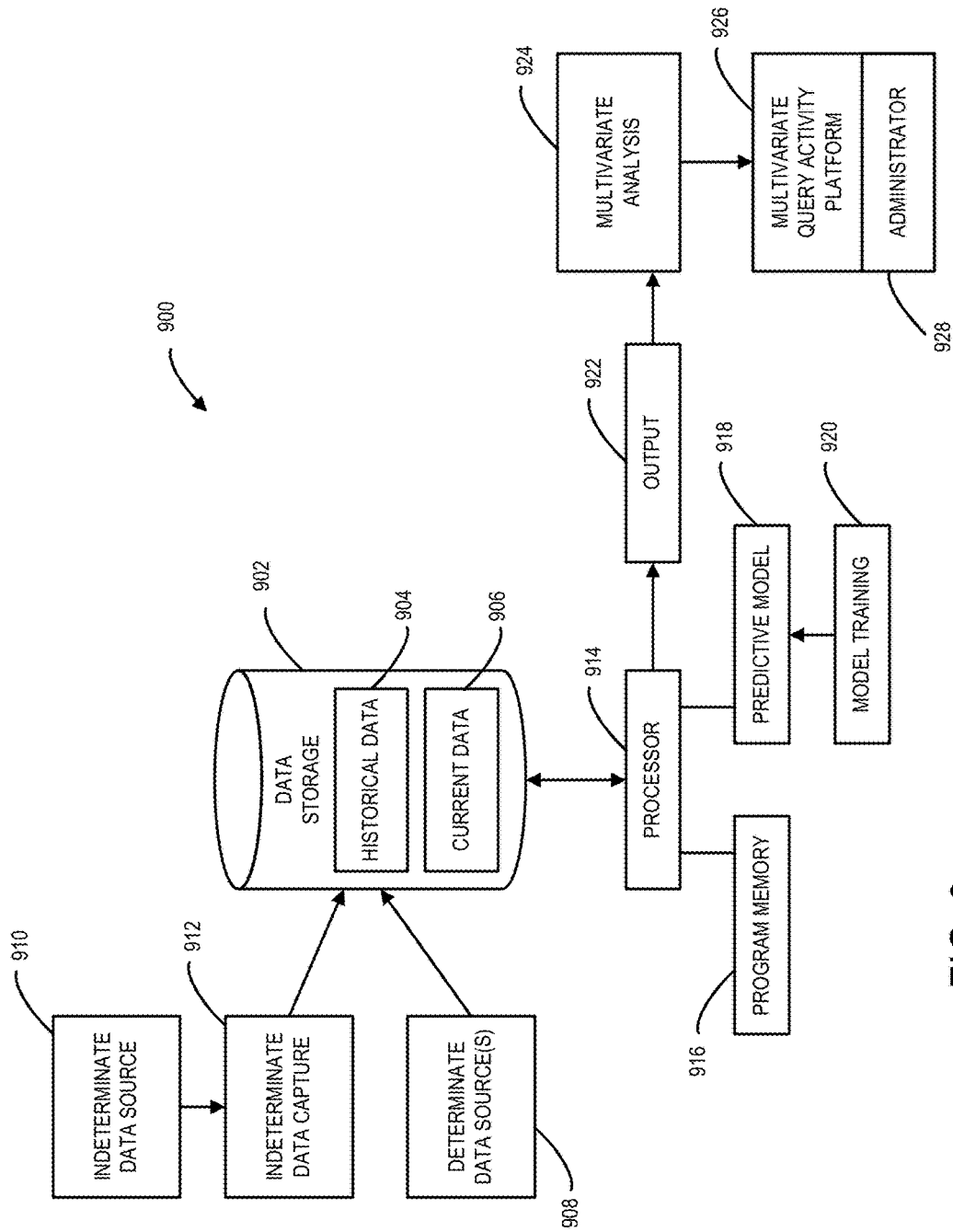
FIG. 9 illustrates a system having a predictive model in accordance with some embodiments.

According to some embodiments, one or more predictive models may be used to select, create, and/or evaluate electronic messages. Features of some embodiments associated with a predictive model will now be described by first referring to FIG. 9. FIG. 9 is a partially functional block diagram that illustrates aspects of a computer system 900 provided in accordance with some embodiments of the invention. For present purposes it will be assumed that the computer system 900 is operated by an insurance company (not separately shown) for the purpose of supporting automated multivariate testing (e.g., to optimize a series of email messages sent to potential customers).

The computer system 900 includes a data storage module 902. In terms of its hardware the data storage module 902 may be conventional, and may be composed, for example, by one or more magnetic hard disk drives. A function performed by the data storage module 902 in the computer system 900 is to receive, store and provide access to both historical transaction data (reference numeral 904) and current transaction data (reference numeral 906). As described in more detail below, the historical transaction data 904 is employed to train a predictive model to provide an output that indicates an identified performance metric and/or an algorithm to score performance factors, and the current transaction data 906 is thereafter analyzed by the predictive model. Moreover, as time goes by, and results become known from processing current transactions (e.g., email messages), at least some of the current transactions may be used to perform further training of the predictive model. Consequently, the predictive model may thereby adapt itself to changing conditions.

Either the historical transaction data 904 or the current transaction data 906 might include, according to some embodiments, determinate and indeterminate data. As used herein and in the appended claims, "determinate data" refers to verifiable facts such as the an age of a home; an automobile type; a policy date or other date; a driver age; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files.

The determinate data may come from one or more determinate data sources 908 that are included in the computer system 900 and are coupled to the data storage module 902. The determinate data may include "hard" data like a claimant's name, date of birth, social security number, policy number, address, an underwriter decision, etc. One possible source of the determinate data may be the insurance company's policy database (not separately indicated).

The indeterminate data may originate from one or more indeterminate data sources 910, and may be extracted from raw files or the like by one or more indeterminate data capture modules 912. Both the indeterminate data source(s) 910 and the indeterminate data capture module(s) 912 may be included in the computer system 900 and coupled directly or indirectly to the data storage module 902. Examples of the indeterminate data source(s) 910 may include data storage facilities for document images, for text files, and digitized recorded voice files. Examples of the indeterminate data capture module(s) 912 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual.

The computer system 900 also may include a computer processor 914. The computer processor 914 may include one or more conventional microprocessors and may operate to execute programmed instructions to provide functionality as described herein. Among other functions, the computer processor 914 may store and retrieve historical insurance transaction data 904 and current transaction data 906 in and from the data storage module 902. Thus the computer processor 914 may be coupled to the data storage module 902.

The computer system 900 may further include a program memory 916 that is coupled to the computer processor 914. The program memory 916 may include one or more fixed storage devices, such as one or more hard disk drives, and one or more volatile storage devices, such as RAM devices. The program memory 916 may be at least partially integrated with the data storage module 902. The program memory 916 may store one or more application programs, an operating system, device drivers, etc., all of which may contain program instruction steps for execution by the computer processor 914.

The computer system 900 further includes a predictive model component 918. In certain practical embodiments of the computer system 900, the predictive model component 918 may effectively be implemented via the computer processor 914, one or more application programs stored in the program memory 916, and computer stored as a result of training operations based on the historical transaction data 904 (and possibly also data received from a third party). In some embodiments, data arising from model training may be stored in the data storage module 902, or in a separate computer store (not separately shown). A function of the predictive model component 918 may be to determine appropriate risk parameters and/or scoring algorithms. The predictive model component may be directly or indirectly coupled to the data storage module 902.

The predictive model component 918 may operate generally in accordance with conventional principles for predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a predictive model to operate as described herein.

Still further, the computer system 900 includes a model training component 920. The model training component 920 may be coupled to the computer processor 914 (directly or indirectly) and may have the function of training the predictive model component 918 based on the historical transaction data 904 and/or information about potential insureds. (As will be understood from previous discussion, the model training component 920 may further train the predictive model component 918 as further relevant data becomes available.) The model training component 920 may be embodied at least in part by the computer processor 914 and one or more application programs stored in the program memory 916. Thus, the training of the predictive model component 918 by the model training component 920 may occur in accordance with program instructions stored in the program memory 916 and executed by the computer processor 914.

In addition, the computer system 900 may include an output device 922. The output device 922 may be coupled to the computer processor 914. A function of the output device 922 may be to provide an output that is indicative of (as determined by the trained predictive model component 918) particular performance metrics, automatically generated message content, and/or evaluation results. The output may be generated by the computer processor 914 in accordance with program instructions stored in the program memory 916 and executed by the computer processor 914. More specifically, the output may be generated by the computer processor 914 in response to applying the data for the current simulation to the trained predictive model component 918. The output may, for example, be a numerical estimate and/or likelihood within a predetermined range of numbers. In some embodiments, the output device may be implemented by a suitable program or program module executed by the computer processor 914 in response to operation of the predictive model component 918.

Still further, the computer system 900 may include a multivariate analysis module 924. The multivariate analysis module 924 may be implemented in some embodiments by a software module executed by the computer processor 914. The multivariate analysis module 924 may have the function of rendering a portion of the display on the output device 922. Thus, the multivariate analysis module 924 may be coupled, at least functionally, to the output device 922. In some embodiments, for example, the multivariate analysis module 924 may report results and/or predictions by routing, to an administrator 928 via multivariate query activity platform 926, a results log and/or message content generated by the predictive model component 918. In some embodiments, this information may be provided to an administrator 928 who may also be tasked with determining whether or not the results may be improved (e.g., by further adjusting message content).

FIG. 10A illustrates an exemplary results log display 1000 that might be associated with various embodiments described herein. The display 1000 might be provided, for example, to an operator and/or administrator such that he or she may improve the content of email messages. The display 1000 might include, for example, results 1010 associated with messages (and replies received in connection with those messages). The results 1010 might include, for example, a message name, a message subject, a form name (e.g., defining the body of an email message), a date and time the message was transmitted, a number of messages delivered, a number of messages that were opened, a click-through total or rate, etc. This information may then be used by the operator or administrator to evaluate the performance of different types of messages.

Figure 10B:
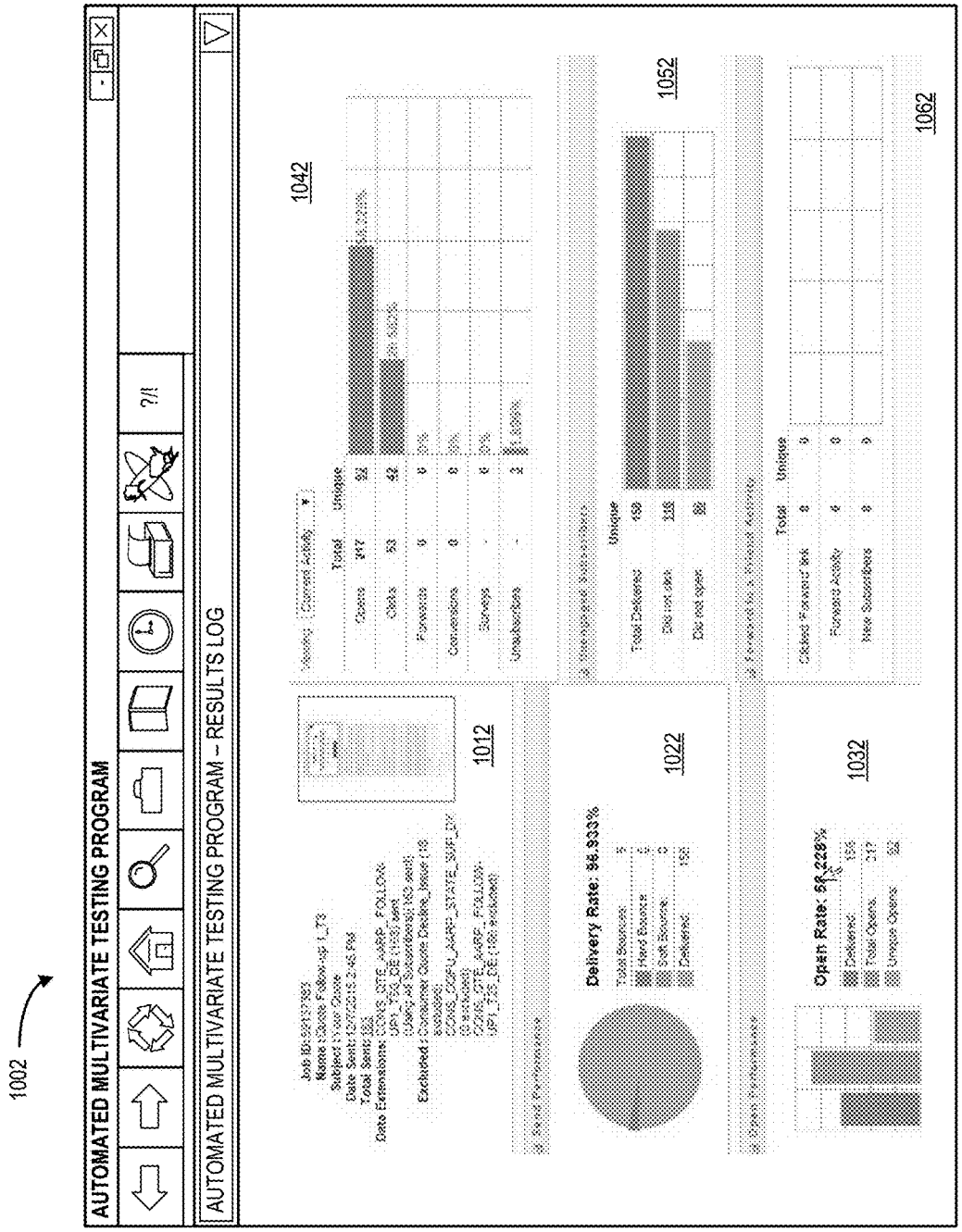

FIG. 10B illustrates another results log display 1002 according to some embodiments. This results log display 1002 includes a graphic representation of electronic message content 1012 along with a pie chart 1022 graphically indicating send performance (e.g., hard bounces, soft bounces, and/or successful deliveries). The display 1002 further indicates open performance 1032 (e.g., an overall open rate, a number of email delivered, a total number of opens, and/or a number of unique opens). An overall inbox performance area 1042 may display opens, clicks, forwards, conversions, surveys, unsubscribes, etc. The display 1002 further includes information about unengaged subscribers 1052 (e.g., a total number of delivered messages, a number of messages or links not clicked, and a number of messages not opened) and information about emails being forwarded to friends 1062 (e.g., a number of users who clicked a "forward to friend link," a forward activity indication, and a total number of new subscribers who were harvested based on the email message).

Thus, embodiments may provide an automated and efficient way to generate and/or evaluate electronic messages, such as emails. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 11:
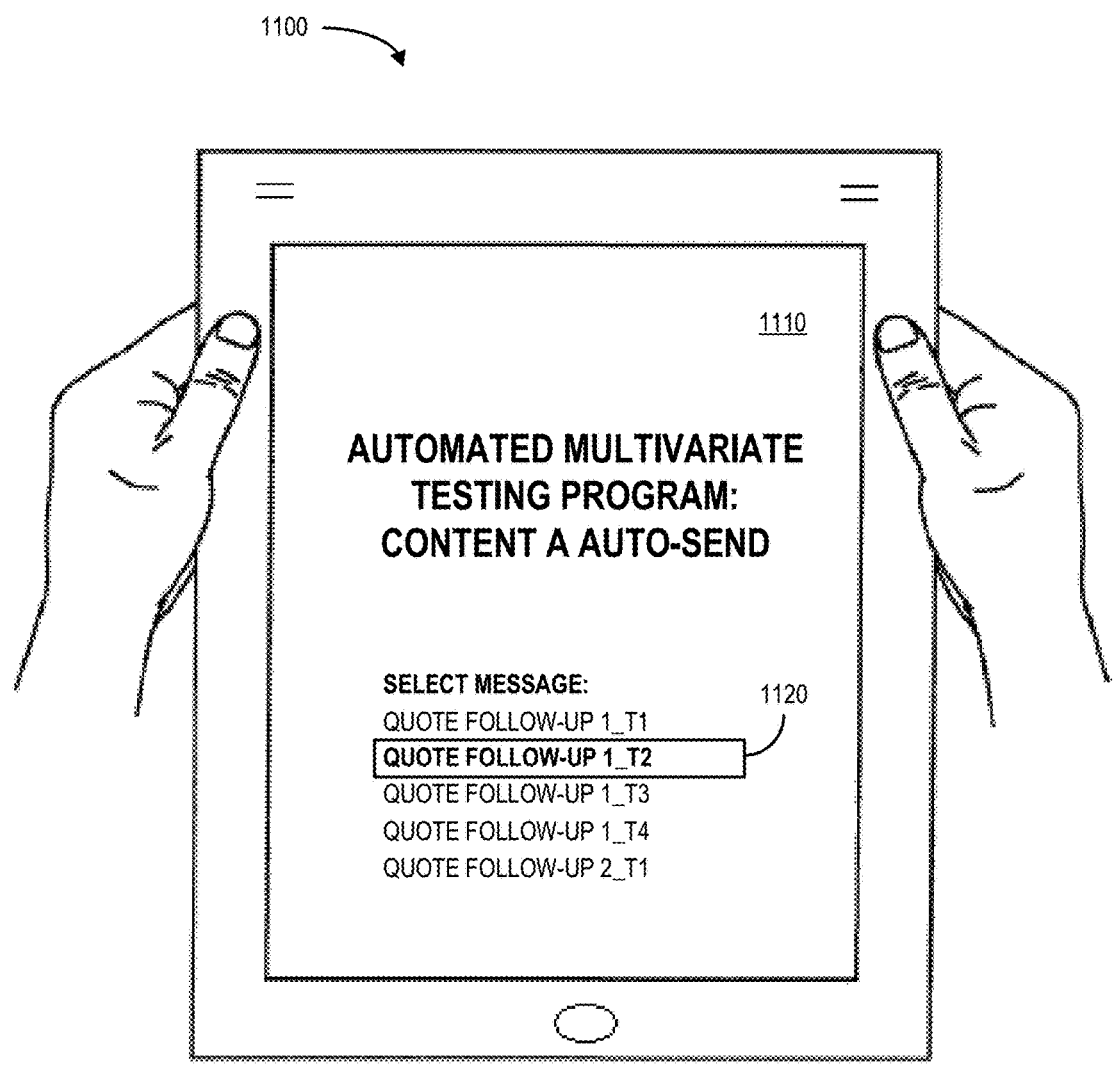
FIG. 11 illustrates a tablet computer displaying multivariate testing program information according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of electronic messages (e.g., emails), embodiments may instead be associated with other types of messages (e.g., chat implementations, web-based messaging, etc.). Similarly, although a certain number of test messages were transmitted in some embodiments described herein, other numbers of test messages might be used instead (e.g., a system might automatically create and evaluate a dozen different versions of a message simultaneously). Still further, the displays and devices illustrated herein are only provided as examples, and embodiments may be associated with any other types of user interfaces. For example, FIG. 11 illustrates a handheld automated multivariate testing program display 1100 according to some embodiments. The automated multivariate testing program display 1100 might include graphical icons 1110 providing information about message content to be selected 1120 and/or modified by a user of the handheld computer.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to launch electronic messages via a distributed communication network by an automated back-end application computer server, comprising:
   (a) a periodic data feed source input;
   (b) a communication port to facilitate a transmission of a series of related electronic messages over a period of time to a set of electronic destination communication addresses via the distributed communication network;
   (c) a data store containing electronic files associated with a current message content, a first modified message content, and a second modified message content; and
   (d) the back-end application computer server, coupled to the periodic data feed source input, the communication port, and the data store, having a computer processor and a computer memory storing instructions to be executed by the computer processor such that the computer processor is programmed to:
      (i) for each electronic message in the series, create, based on information from the periodic data feed source input, a database import table associated with the set of electronic destination communication addresses,
      (ii) for each electronic message in the series, automatically, randomly, and dynamically split the set of electronic destination communication addresses into multivariate segments, including at least:
         a current message content subset,
         a first modified message content subset, and
         a second modified message content subset,
      (iii) automatically launch the current message content, the first modified message content, and the second modified message content to electronic destination communication addresses as appropriate in accordance with the multivariate segments,
      (iv) create a results log based on computer implemented responses to the current message content, the first modified message content, and the second modified message content, and
      (v) transmit indications associated with the results log to generate an interactive user interface display.

2. The system of claim 1, wherein the automatic launch of message content is performed in accordance with at least one throttling parameter.

3. The system of claim 2, wherein the throttling parameter is associated with at least one of: (i) an automatically determined value, and (ii) a value that has been adjusted by an administrator or operator.

4. The system of claim 1, wherein the multivariate segments are generated via database query activity.

5. The system of claim 1, wherein at least some database interactions comprise: (i) an import suppression, (ii) an import definition, (iii) an audience filter, (iv) a filter activity definition, (v) a query definition, and (vi) content launching.

6. The system of claim 1, wherein the interactive graphical user interface display is associated with an aggregate custom report comparing content metrics across the multivariate segments.

7. The system of claim 6, wherein the electronic messages comprise emails.

8. The system of claim 7, wherein the current message content, the first modified message content, and the second modified message content differ with respect to at least one two of: (i) a message subject, (ii) a message body, (iii) a message layout, (iv) message text, and (v) a message image.

9. The system of claim 8, wherein the content metrics are associated with at least one of: (i) message unique open indications, (ii) message unique click-through indications, and (iii) a response rate.

10. The system of 1, wherein the back-end application server is further to automatically generate at least one of the first modified message content and the second modified message content in accordance with past results logs and an automated predictive model.

11. A computerized method to launch a series of related emails over a period of time via a distributed communication network by an automated back-end application computer server, comprising:

creating, by the back end application server based on information from the periodic data feed source input, a database import table associated with a set of electronic destination email addresses;

for each email in the series, automatically, randomly, and dynamically splitting the set of electronic destination email addresses into multivariate segments, including at least: a current email content subset associated with a current email content, a first modified email content subset associated with a first modified email content, and a second modified email content subset associated with a second modified email content, wherein the current email content, the first modified email content, and the second modified email content differ with respect to at least one two of: (i) an email subject, (ii) an email message body, (iii) an email message layout, (iv) email text, and (v) an email image;

receiving from an interactive graphical user interface display at least one time-based transmission characteristic to be associated with at least one of the multivariate segments;

for each email in the series, automatically launching the current email content, the first modified email content, and the second modified email content to electronic destination email addresses as appropriate in accordance with the multivariate segments and the at least one time-based transmission characteristic;

creating a results log based on computer implemented responses to the current email content, the first modified email content, and the second modified email content; and transmitting indications associated with the results log to be rendered via the interactive graphical user interface display.

12. The method of claim 11, wherein the multivariate segments are generated via database query activity.

13. The method of claim 11, wherein at least some database interactions comprise: (i) an import suppression, (ii) an import definition, (iii) an audience filter, (iv) a filter activity definition, (v) a query definition, and (vi) content launching.

14. The method of claim 11, wherein the interactive graphical user interface display is associated with an aggregate custom report comparing content metrics across the multivariate segments.

15. The method of claim 14, wherein the content metrics are associated with at least one of: (i) email unique open indications, (ii) email unique click-through indications, and (iii) an email response rate.

16. A non-transient, computer-readable medium storing instructions, that, when executed by a processor, cause the processor to perform a method to launch a series of related emails over a period of time via a distributed communication network by an automated back-end application computer server, the method comprising:

creating, by the back end application server based on information from the periodic data feed source input, a database import table associated with a set of electronic destination email addresses;

for each email in the series, automatically, randomly, and dynamically splitting the set of electronic destination email addresses into multivariate segments, including at least: a current email content subset associated with a current email content, a first modified email content subset associated with a first modified email content, and a second modified email content subset associated with a second modified email content;

receiving from an interactive graphical user interface display at least one time-based throttling characteristic to be associated with at least one of the multivariate segments;

for each email in the series, automatically launching the current email content, the first modified email content, and the second modified email content to electronic destination email addresses as appropriate in accordance with the multivariate segments and the at least one time-based throttling characteristic;

creating a results log based on computer implemented responses to the current email content, the first modified email content, and the second modified email content; and transmitting indications associated with the results log to be rendered via the interactive graphical user interface display, wherein the interactive graphical user interface display is used to define email content comprising at least two of: an email subject, an email message body, an email message layout, email text, and an email image.

17. The medium of claim 16, wherein the multivariate segments are generated via database query activity.

* * * * *